R. C. TOMPKINS.
Hog-Scraping Machine.
No. 196,269. Patented Oct. 16, 1877.
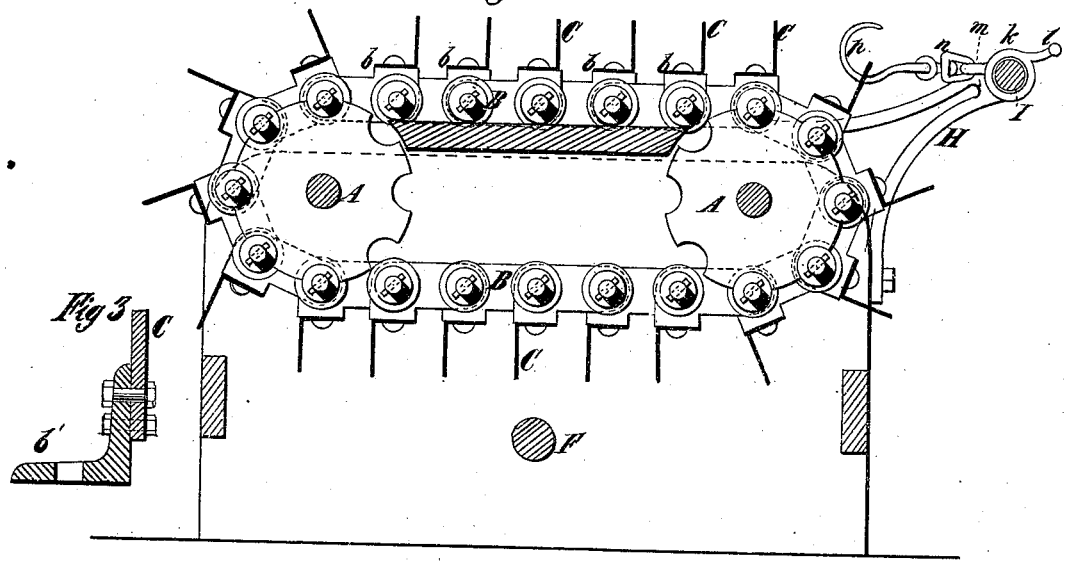
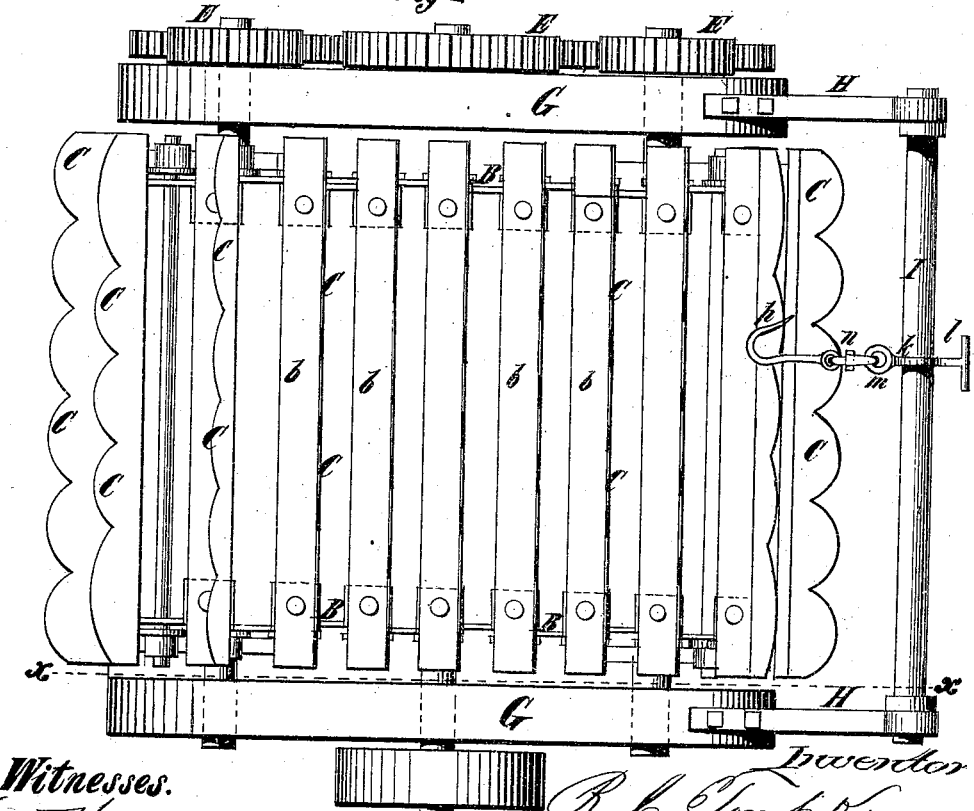

UNITED STATES PATENT OFFICE.

RHINELANDER C. TOMPKINS, OF NEW YORK, ASSIGNOR TO HIMSELF AND AMASA SPRING, OF WHITE PLAINS, N. Y.

IMPROVEMENT IN HOG-SCRAPING MACHINES.

Specification forming part of Letters Patent No. 196,269, dated October 16, 1877; application filed March 29, 1877.

*To all whom it may concern:*

Be it known that I, RHINELANDER C. TOMPKINS, of the city, county, and State of New York, have invented certain new and useful Improvements in Machines for Scraping Animal Carcasses; and I do hereby declare that the following is a full, clear, and exact description of the same, reference being had to the accompanying drawing, forming part of this specification.

My invention is an improvement upon a machine for scraping animal carcasses for which Letters Patent were granted to me November 11, 1873.

The machine is more particularly applicable to machines for scraping hogs when slaughtered and scalded; but it may be applied to other purposes.

The invention consists in an improved construction, arrangement, and attachment of scraper-blades of machines for scraping animal carcasses.

One defect in the operation of the original machine, upon which the present invention is an improvement, was that the scrapers were apt to cut into the flesh of the carcass in scraping, when the scrapers came in contact with the prominences of the carcass at the hips and in other portions. I obviate this defect, in my present invention, by making the profile of the scrapers curvilinear, preferably semicircular or approximately semicircular.

When the aforesaid prominences at the hips and other parts of the carcass are presented to the higher parts of the curvilinear scrapers, the flexible body of the animal yields, and allows the prominences to pass through the hollows between the scrapers, in such manner that while the said prominences are thoroughly scraped, they are never cut, bruised, or mutilated.

Another defect overcome by my present invention is the difficulty experienced in holding the carcass solely by muscular power upon the scrapers, which pull upon the animal with great force. This defect is overcome by the provision of a hook swiveled to a collar sliding on a rigid bar fixed at right angles with the line of motion of the scrapers, which hook is engaged in the under jaw of the carcass, and serves to hold the carcass upon the scrapers, the operator having to use no muscular exertion while scraping except to roll the carcass longitudinally upon the scrapers.

These improvements greatly add to the convenience and utility of the machine.

Figure 1 in the accompanying drawing is a vertical section, on the line $x\, x$ in Fig. 2, of a machine comprising my improvements. Fig. 2 is a top view of the same. Fig. 3 is an enlarged detail, showing one method of attaching the scraper-blades to the aforesaid base.

A represents rag-wheels, upon which run endless chains B, which carry the scraper-blades C, said rag-wheels being impelled by suitable gearing E, connected with a main driving-shaft, F.

Said scraper-blades are curvilinear in their profile, and they may be made of angle-steel, in one piece, with a continuous base, $b$, extending from one endless chain to the other, as shown in Figs. 1 and 2; but they are preferably made separately and attached to a base, $b'$, of angle-iron, as shown in Fig. 3. In either case said base extends at or nearly at right angles with said scraper-blades, and is long enough to reach from one of the endless chains to the other, and attached to both said chains, as shown in Fig. 2. Said bases, with their attached scrapers, are attached to said endless chains in parallel relation, as shown in Fig. 2.

Said curvilinear scraper-blades C are preferably made of semicircular or approximately semicircular profile, and they are staggered in their position relatively with each other on the chains, as shown in Fig. 2. Their edges are formed in the usual manner of the edges of scrapers. To opposite sides of the upper portion of the frame G are attached the brackets H. Said brackets support, in parallel relation with the scraper-blades, a rigid bar, I.

Upon the bar I is loosely fitted a sliding collar, $k$, preferably having attached to it a handle, $l$. To the said collar is also attached an eye, $m$, to which is connected a swivel, $n$. To the said swivel is connected the hook $p$.

The operation of the machine is as follows: The machine being in motion, the carcass to be scraped, placed on the top of the machine and resting upon the scraper-blades C, is firmly held in due relation therewith by the swiveled hook $p$ inserted in the arch of the lower jaw-bone. The operator then rolls the carcass longitudinally from the side of the machine upon which said carcass was first placed to the other side of the machine, whence said animal is rolled onto a table or bench arranged for its reception.

The swiveled hook $p$, attached to the bar I by the sliding collar $k$, is permitted thereby to accommodate itself to the change of position of the carcass so rolled from side to side of the machine, every part of the carcass so treated being thoroughly scraped except a small portion near the tail, from which the hair has to be removed by hand-scraping.

By these improvements I avoid the defects of the original machine, and render it much more effective and convenient in use.

I claim—

The scraper-blades C, having a curvilinear profile, attached to bases $b$, and staggered in their positions upon the endless chains, substantially as and for the purpose described.

In testimony whereof I hereunto sign my name in the presence of two subscribing witnesses.

R. C. TOMPKINS.

Witnesses:
 BENJAMIN W. HOFFMAN,
 FRED. HAYNES.